(12) United States Patent
Moreau

(10) Patent No.: US 7,071,636 B2
(45) Date of Patent: Jul. 4, 2006

(54) SCANNING CIRCUIT OF ELECTRON TUBE DISPLAYS

(75) Inventor: Jean-Michel Moreau, Grenoble (FR)

(73) Assignee: STMicroelectronics S.A., Montrouge (FR)

( * ) Notice: Subject to any disclaimer, the term of this patent is extended or adjusted under 35 U.S.C. 154(b) by 5 days.

(21) Appl. No.: 10/423,659

(22) Filed: Apr. 25, 2003

(65) Prior Publication Data

US 2004/0100198 A1 May 27, 2004

(30) Foreign Application Priority Data

Nov. 26, 2002 (EP) ............................................. 02354185

(51) Int. Cl.
*H01J 29/72* (2006.01)

(52) U.S. Cl. ........................................ 315/391; 348/806
(58) Field of Classification Search ................ 315/370, 315/371, 382, 389, 391, 393; 348/747, 805, 348/806
See application file for complete search history.

(56) References Cited

U.S. PATENT DOCUMENTS

| | | | | |
|---|---|---|---|---|
| 4,287,531 A | * | 9/1981 | Mitamura et al. .......... | 348/813 |
| 4,939,429 A | * | 7/1990 | Rodriguez-Cavazos et al. | 315/411 |
| 5,428,269 A | * | 6/1995 | Hedrick ...................... | 315/369 |
| 5,455,493 A | * | 10/1995 | Pulluru et al. .............. | 315/408 |
| 5,600,212 A | * | 2/1997 | Hirtz et al. ................. | 315/391 |
| 5,644,612 A | * | 7/1997 | Moorman et al. .......... | 378/98.2 |
| 5,652,482 A | * | 7/1997 | Tripod ........................ | 315/370 |
| 6,590,620 B1 | * | 7/2003 | Hirakawa ................... | 348/806 |
| 6,645,990 B1 | * | 11/2003 | Askew et al. ............... | 315/411 |

* cited by examiner

*Primary Examiner*—Wilson Lee
(74) *Attorney, Agent, or Firm*—Lisa K. Jorgenson; James H. Morris; Wolf, Greenfield & Sacks, P.C.

(57) ABSTRACT

The invention concerns a control circuit for an electron tube display comprising a deflection coil, the deflection coil being part of a scanning circuit and being coupled to a coil of a transformer powering a high voltage generator used to accelerate an electron beam, a phase locked loop being used to keep in phase the flyback pulses produced by the scanning circuit and the video signal synchronisation pulses, and comprising an electron beam current measuring circuit, a compensation circuit for compensating the phase difference between the flyback pulses and the video signal synchronisation pulses as a function of the measured current.

19 Claims, 5 Drawing Sheets

SCANNING CIRCUIT OF ELECTRON TUBE DISPLAYS

BACKGROUND OF THE INVENTION

1. Field of the Invention

The present invention relates to horizontal scanning circuits of electron tube displays. The present invention more specifically relates to compensation circuits of electron beam deflection.

2. Discussion of the Related Art

A well known issue of electron beam deflection is the "breathing" phenomenon. Bright images are wider than dark ones. In fact, bright images require a higher electron beam current than dark images. When the electron beam current increases, the high voltage (HV) of the electron tube display accelerating the electron beam decreases due to the power supply internal resistance. As the acceleration of the electrons decreases, their deflection increases. Bright video displays are then wider (more deviated to the right and to the left) than dark video displays.

Known breathing compensation circuits include HV measuring circuits. Scanning circuits are adapted to change the deflection coil current according to the measured HV variation so as to compensate for electron beam deflection variations.

When a user tunes the breathing compensation circuit so that dark images are as wide as bright images, he looks at one side of the screen and makes sure that dark images start at the same position as bright images. This tuning is enough as breathing effects are symmetrical. Indeed, a same electron beam current is deviated as much to the left as to the right.

Nevertheless, the applicant noticed that, in many CRTs, when tuning the breathing compensation circuit to adjust the left side of the image, another deflection effect appears when switching from a dark image to a bright image or conversely. When switching from a dark image to a bright image, while the position of the left side of the image no longer changes, the right side of the image shifts to the left. Conversely, the right side of the image shifts to the right when switching from a bright to a dark image.

Consequently, a purpose of this invention is to provide an electron tube display control circuit that overcomes the drawback described above.

SUMMARY OF THE INVENTION

To attain these purposes and others, the present invention provides a control circuit for an electron tube display comprising a deflection coil, the deflection coil being part of a scanning circuit and being coupled to a coil of a transformer powering a high voltage generator used to accelerate an electron beam, a phase locked loop being used to keep in phase the flyback pulses produced by the scanning circuit and the video signal synchronisation pulses, comprising: an electron beam current measuring circuit, a compensation circuit for compensating the phase difference between the flyback pulses and the video signal synchronisation pulses as a function of the measured current.

In one embodiment of such a control circuit, one terminal of the coil of the transformer powering the high voltage generator is linked to a storage capacitor by a diode, the voltage through the storage capacitor being equal to the high voltage, the second terminal of the coil being connected to the intermediate node between a capacitor and a resistor in series between a power supply and the ground, the capacitor and the resistor constituting the electron beam current measuring circuit.

In one embodiment of such a control circuit, a resistive bridge is connected between the intermediate node between the capacitor and the resistor and the ground.

In one embodiment of such a control circuit, the compensation circuit modifies, according to the electron beam current measured, the output control signal of a phase comparator which is part of the phase locked loop, the phase comparator detecting differences in phase between the flyback pulses and the synchronisation pulses.

In one embodiment of such a control circuit, two flyback capacitors in series are connected between one terminal of the deflection coil and the ground, the voltage on the intermediate node between the two flyback capacitors being the flyback pulse analysed by a phase comparator which is part of the phase locked loop, the phase comparator detecting differences in phase between the flyback pulses and the synchronisation pulses.

In one embodiment of such a control circuit, the anode of a second diode is connected to the power supply, the cathode of the second diode being connected to the collector of a bipolar transistor NPN, the anode of a third diode being connected to the intermediate node between the two flyback capacitors, the cathode of the third diode being connected to the collector of the bipolar transistor, the emitter of the bipolar transistor being linked to a fixed voltage supply by a second resistor, the base of the bipolar transistor being connected to the intermediate node between the capacitor and the resistor.

BRIEF DESCRIPTION OF THE DRAWINGS

The foregoing and other purposes, features, aspects and advantages of the invention will become apparent from the following detailed description of embodiments, given by way of illustration and not limitation with reference to the accompanying drawings.

DETAILED DESCRIPTION OF THE INVENTION

Figure 1:
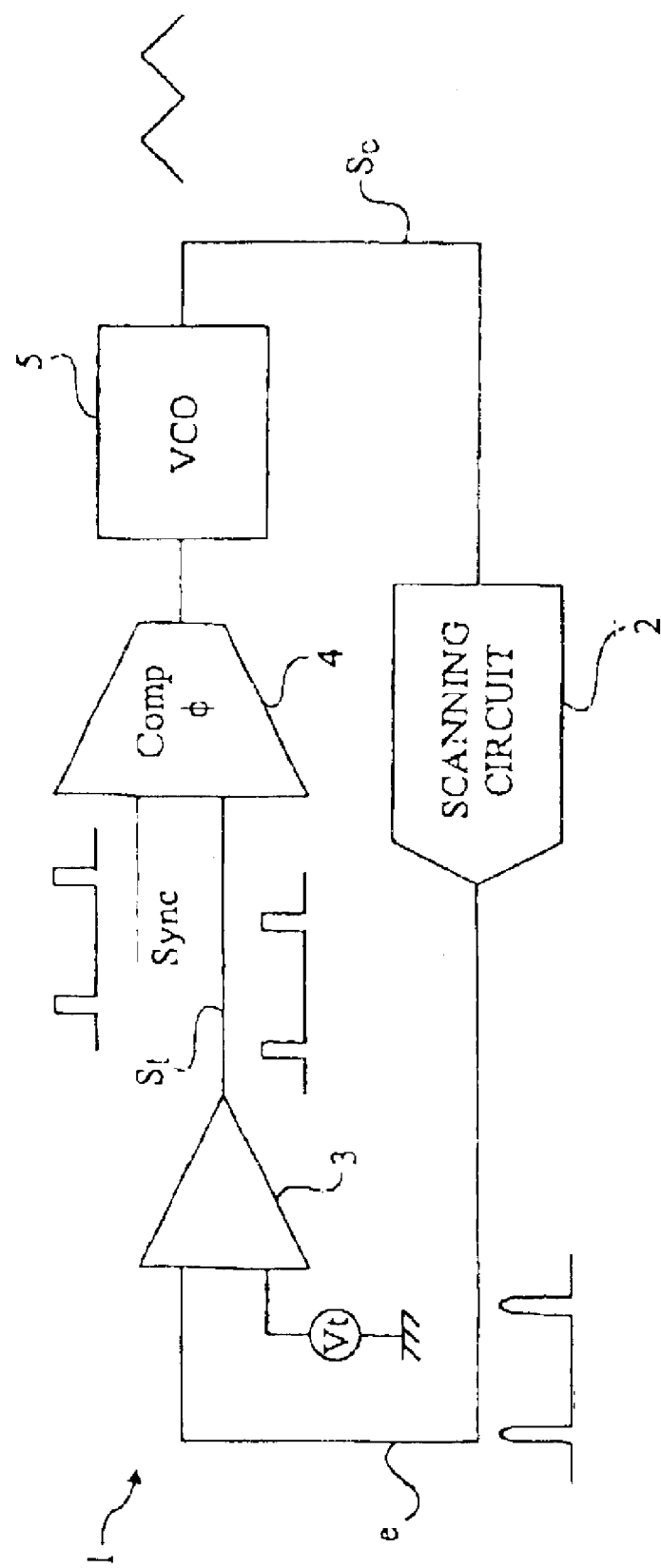
FIG. 1 is a circuit diagram of an existing control circuit of a scanning circuit.

FIG. 1 is a diagram of a control circuit 1 of a scanning circuit 2 powering a deflection coil. The control circuit 1 receives a video synchronization signal Sync and controls the scanning circuit 2 so that the deflection coil current is delivered at the right time with respect to the received video signal. The control circuit 1 comprises a threshold detector 3 which analyses the voltage e through the deflection coil and compares it to a threshold voltage Vt. A phase comparator 4 receives the video synchronization signal Sync and the output signal $S_t$ of the threshold detector 3. The phase comparator 4 controls a voltage control oscillator (VCO) 5 which applies a control signal $S_c$ to the scanning circuit 2. The phase comparator 4 detects phase differences between the video synchronization signal Sync and the threshold detector signal $S_t$ and controls the VCO 5 so that the scanning circuit triggers flyback pulses in phase with the received video signal.

Figure 2A:
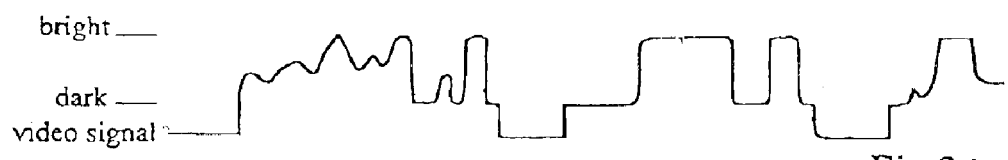
FIGS. 2A–2E illustrate signal waveforms explaining the operation of the control circuit shown in FIG. 1.
Figure 2B:
Figure 2C:
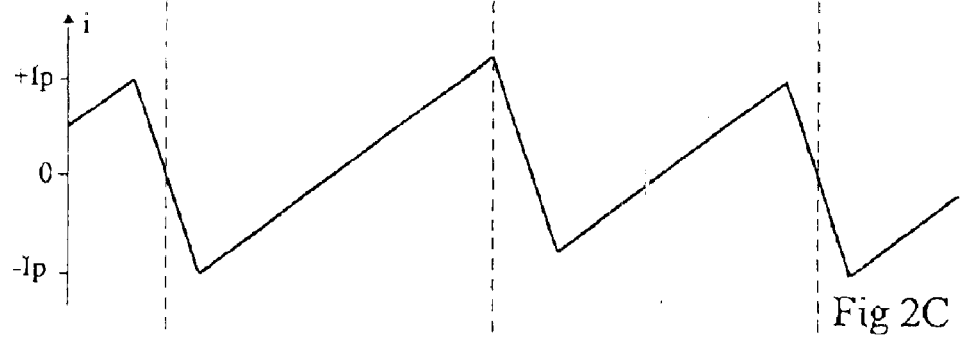
Figure 2D:
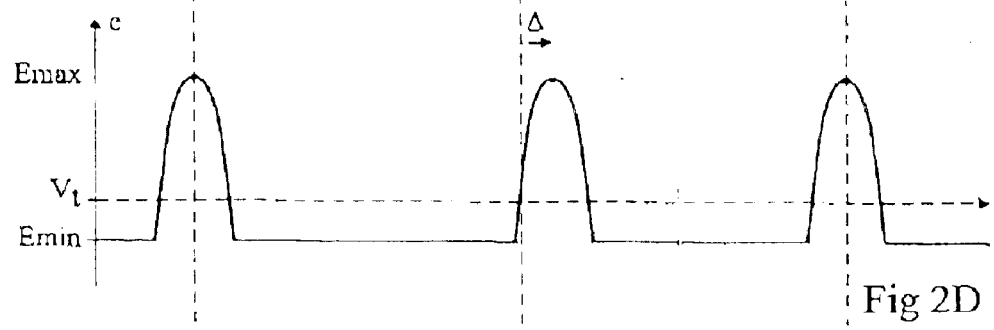
Figure 2E:
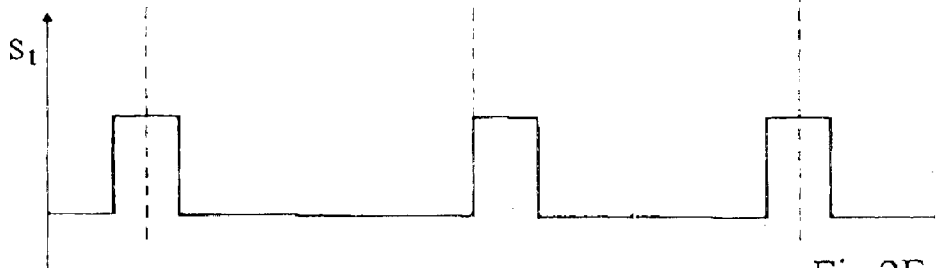

FIGS. 2A–2E illustrate signal waveforms of the control circuit 1 of FIG. 1. A video signal, shown in FIG. 2A, includes periodic synchronization pulses between which brightness information are provided. In this example, the video signal voltage is low when the image is dark and high when the image is bright. As shown in FIG. 2B, the video synchronization signal Sync comprises a series of pulses extracted from the video signal. Each synchronization pulse indicates that a flyback must be done to start a new line. The deflection coil current i, shown in FIG. 2C, is a sawtooth signal. It is negative and equal to −Ip when starting a new line and it increases until +Ip at the end of the line just before changing line. The deflection coil voltage e, shown in FIG. 2D, is constant and equal to Emin, for example −60 V, during the slow increase of the current i. During the flyback, the current i decreases quickly and the voltage e increases very quickly to reach Emax, which can be as high as 1000 V, and decreases very quickly to come back to the value Emin.

In the example represented, the first pulse of the voltage e is in phase with the first video synchronisation signal pulse (Sync). More precisely, the middle of the first pulse of the voltage e corresponds to the rising edge of the first pulse of the video synchronisation signal Sync. The second pulse of the voltage e is delayed of Δ with respect to the rising edge of the second pulse of the signal Sync. This can appear for example when the temperature or the voltage of the control circuit 1 changes. The third pulse is again in phase with the third video synchronisation signal pulse thanks to the phase locked loop action.

Figure 3:
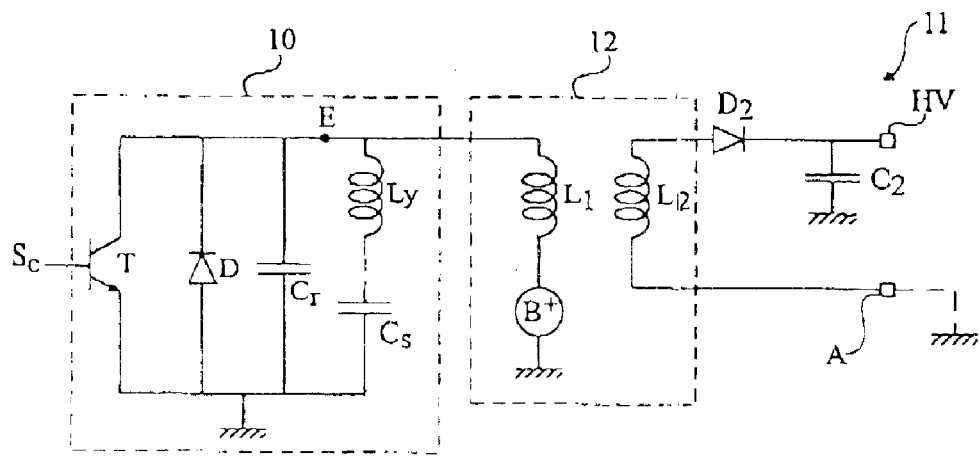
FIG. 3 is a circuit diagram of an existing scanning circuit and a HV transformer.

FIG. 3 shows in its left side a typical scanning circuit 10. The scanning circuit 10 comprises a bipolar NPN transistor T, which is switched on or off according to the control signal $S_C$ produced by the VCO 5. The emitter of transistor T is grounded and its collector is connected to a node E. The anode of a diode D is grounded and its cathode is connected to the node E. A capacitor Cr is connected between the node E and the ground. A deflection coil Ly is connected between the node E and a first electrode of a capacitor Cs, whose second electrode is grounded. One terminal of a coil L1 is connected to the node E. The other terminal of the coil L1 is connected to the ground through a power supply B+ which is used to provide the DC voltage of the capacitor Cs through the deflection coil Ly. The voltage of the power supply B+ is in the example around 60 V.

The scanning circuit 10 represented in FIG. 3 is in fact the equivalent circuit of a scanning circuit once the oscillation in the deflection coil is set. When transistor T is conductive, the deflection coil current increases. When transistor T is not conductive, the deflection coil current decreases quickly and the voltage e on the node E increases quickly, as described in relation to FIG. 2.

In order to reduce the number of components in the control circuit of the electron tube display, the high voltage HV used to accelerate the electron beam is produced using a transformer whose primary winding is the coil L1. It is then possible to take advantage of the high voltage on the node E during line switching to generate the high voltage. A typical HV supply circuit 11 is shown on the right side of FIG. 3. The coil L1 is coupled to a coil L2, whose first extremity is linked to a high voltage HV pad through a diode D2, and whose second extremity, the node A, is linked to the ground. The cathode of diode D2, connected to the HV pad is also connected to a storage capacitor C2.

When the voltage through coil L2 is high, diode D2 is conductive and the storage capacitor C2 is charged. Thanks to a multiplying coefficient between coil L1 and L2, for example 25, the high voltage HV can reach 25000 V which corresponds to the voltage required to accelerate the electrons.

When the electron beam current increases while the image is bright, the high voltage HV tends to decrease slightly. In order to weaken the breathing issue, a detection unit, not represented, detects that the high voltage HV decreases. This detection unit controls the power supply B+ so as to increase the voltage amplitude of the pulse on node E in order to increase the current loading the capacitor C2. As a consequence, the voltage through coil L2 increases quicker than if there were less current drawn. Coil L2 is coupled with coil L1 which is in parallel with the deflection coil Ly, the voltage across coil L1 and coil Ly being equal. As a consequence, the voltage e increases more quickly than if there were no connection between the scanning circuit 10 and the high voltage generator 11.

Figure 4:
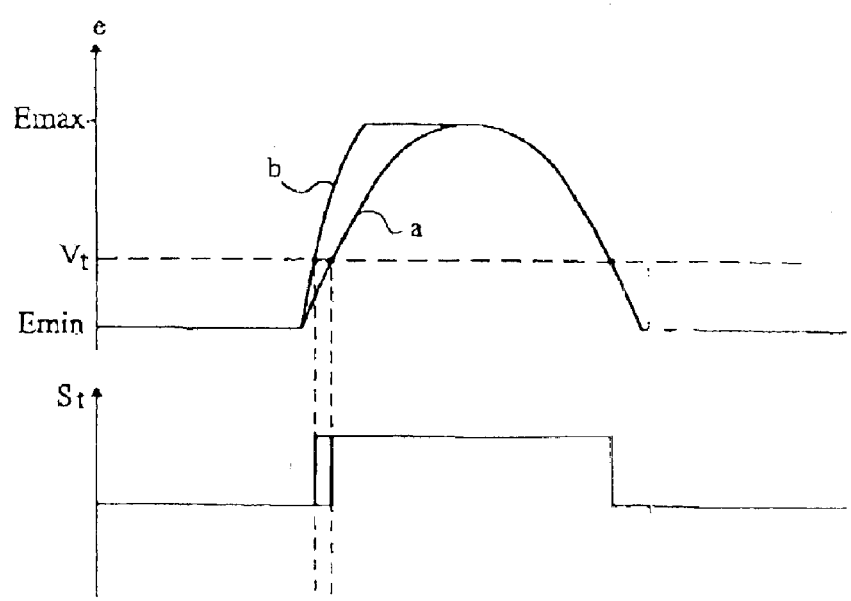
FIG. 4 illustrates two signal waveforms explaining the operation of the control circuit shown in FIG. 3.

FIG. 4 illustrates the phenomenon described above. The voltage e is represented during a flyback. Curve a illustrates the case where there is no reaction due to the detection unit, the increase of voltage e from Emin to Emax is as quick as the decrease from Emax to Emin. Curve b illustrates the effect of the detection unit, the increase from Emin to Emax is quicker than the increase in curve a. The voltage e is then nearly constant due to diode D2 and it decreases as fast as in curve a.

The output signal $S_t$ of the threshold detector 3 of the control circuit 1 is also represented in FIG. 4. As the increase of the voltage e is quicker in curve b, the transition of the signal $S_t$ from 0 to 1 appears sooner. As a consequence, the phase comparator 4 of the control circuit 1 detects that the flyback pulse of the scanning circuit 2 is in advance compared to the pulse of the video synchronization signal Sync. As a result, the control signal $S_C$ is delayed so that the scanning circuit triggers the line switching later. Consequently, the image shifts laterally, to the left if the brightness increases and to the right if the brightness decreases.

Figure 5:
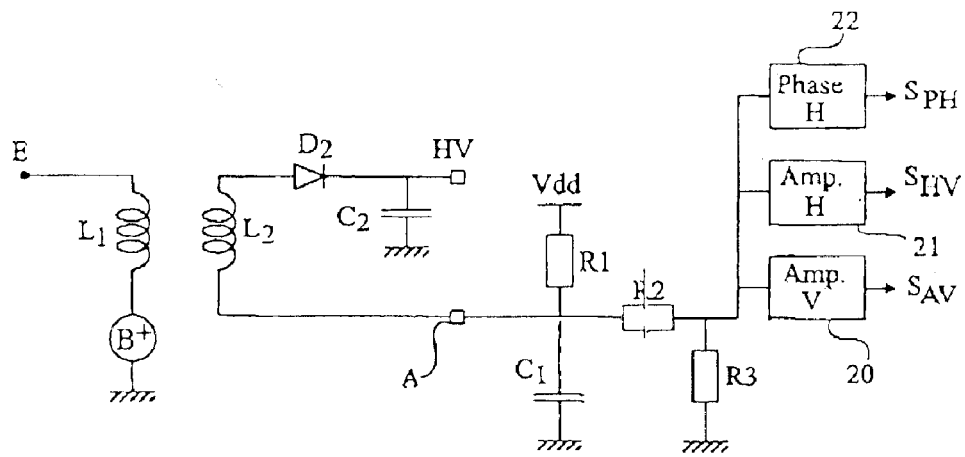
FIG. 5 illustrates a first embodiment of a compensation circuit according to the present invention.

FIG. 5 is a circuit diagram of a compensation circuit according to the present invention. As in the circuit of FIG. 3, the high voltage HV is produced by a transformer 12. A first terminal of the secondary winding L2 of the transformer is connected to a storage capacitor C2 through a diode D2. The second terminal of winding L2, the node A, is connected to the ground through a capacitor C1 and to a power supply Vdd, for example 10 V, through a resistor R1. Two resistors R2 and R3 are serially-connected between node A and the ground, forming a resistive bridge. The intermediate node between R2 and R3 is connected to three compensation control circuits (Amp.V) 20, (Amp.H) 21, (Phase H) 22. The circuits Amp.V 20 and Amp.H 21 are used to control the breathing compensation by applying breathing compensation control signals $S_{AV}$ and $S_{HV}$ respectively to the vertical scanning circuit and to the horizontal scanning circuit of the electron tube display. The circuit Phase H 22 applies a phase compensation control signal $S_{PH}$ to the phase comparator 4 of the circuit 1 of FIG. 1.

Between two flyback pulses, the voltage on the anode of diode D2 is much lower than the HV voltage. Consequently, there is no current through diode D2 and through winding L2. The capacitor C1 is charged by a current drawn through resistor R1. Once capacitor C1 is charged, the voltage on node A is equal to Vdd.

During a flyback pulse, when the voltage on node E increases quickly up to 1000 V, the diode D2 becomes conductive. A current is drawn through diode D2, winding L2 and resistor R1. If the brightness of the image is high, i.e. capacitor C2 has been substantially discharged, the current drawn is high and conversely. The voltage difference between Vdd and node A is proportional to the current drawn. Thus, when the current increases, the voltage on node A decreases and conversely. The compensation control circuits 20, 21 and 22 detect the variation of the electron beam current by analyzing the voltage on node A.

This is a very simple way to detect a high voltage drop. However, other detection circuits could be used.

Figure 6:
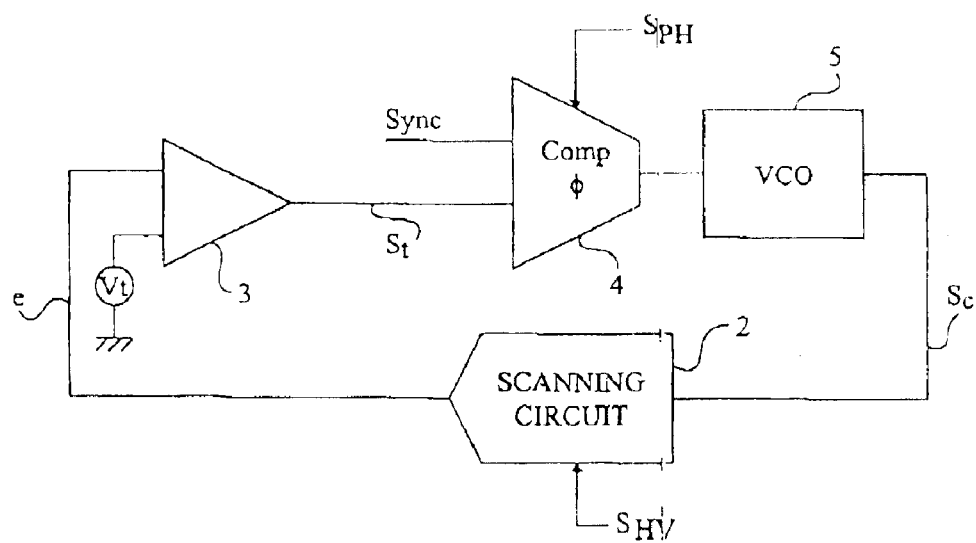
FIG. 6 is a circuit diagram of a control circuit according to the present invention.

FIG. 6 shows all the elements of circuit 1 together with the signal $S_{HV}$ controlling the horizontal scanning circuit 2. There are well known scanning circuits compensating breathing effects in connection with a breathing compensation control signal.

A usual way to compensate breathing issues is to place a coil $L_{var1}$ between the deflection coil Ly and the capacitor Cs, the coil $L_{var1}$ being coupled to a coil $L_{var2}$ in which flows an adjustable direct current. When the direct current through coil $L_{var2}$ is changed, the inductance of $L_{var1}$ is modified. Taking advantage of this, it is possible to decrease the current of the deflection coil Ly when the high voltage HV decreases. As a result, the electron beam is less deviated so as to balance the breathing deviation.

According to the present invention, the phase compensation control signal $S_{PH}$ controls the phase comparator 4 so as to avoid delaying the flyback pulses when the video signal brightness is high. More precisely, when the video signal is bright, the phase comparator 4 detects that the pulses of signal $S_t$ are in advance compared to the pulses of the video signal synchronisation pulses Sync. Without any compensation, the phase comparator 4 would delay the flyback pulses. When a compensation is applied, a phase advance is applied at the output of the phase comparator 4 when the compensation control signal $S_{PH}$ indicates that the beam current has increased. The phase advance is adjusted so as to balance the flyback pulses delay.

Figure 7:
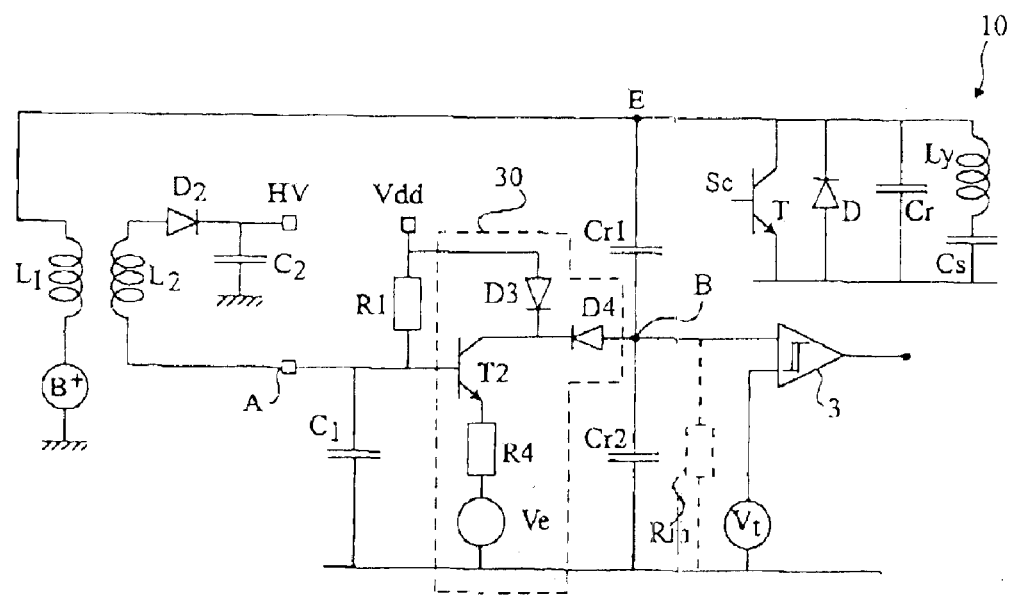
FIG. 7 illustrates a second embodiment of a compensation circuit according to the present invention.

FIG. 7 shows another compensation circuit according to the present invention. This circuit comprises the elements already shown in FIG. 3. As in FIG. 5, the node A is connected to the ground through a capacitor C1 and to a power supply Vdd through a resistor R1. Two capacitors Cr1 and Cr2 are serially connected between the node E and the ground. The voltage of the intermediate node B between the capacitors Cr1 and Cr2 has the same fluctuations as the voltage e on node E. Contrary to the control circuit 1 described in FIG. 1, the threshold detector 3 does not compare voltage e with the threshold voltage $V_t$ but voltage b with $V_t$.

The compensation circuit comprises a circuit 30 used to modify the voltage b on node B. The anode of a diode D3 is connected to the power supply Vdd. The cathode of diode D3 is connected to the collector of a bipolar NPN transistor T2. The anode of a diode D4 is connected to the node B. The cathode of diode D4 is connected to the collector of the transistor T2. The emitter of the transistor T2 is linked to a power supply Ve through a resistor R4. The base of the transistor T2 is connected to the node A.

When the voltage on node E is low, around −60 V, the voltage on node B is negative. Diode D3 is conductive and the voltage on the collector of the transistor T2 is equal to Vdd minus a diode threshold voltage. Diode D4 is not conductive.

When the voltage on node E increases up to 1000 V during a flyback pulse, the voltage on node B increases, for example up to 50 V, and diode D4 becomes conductive. Diode D3 is then not conductive. The voltage on node B decreases as a current is drawn by the circuit 30 through diode D4.

The current drawn by the circuit 30 is a function of the electron beam current. When the electron beam current is high, the voltage on node A is low or null and the current drawn is low. Conversely, When the electron beam current is low, the voltage on node A is high and the current drawn is high.

Figure 8:
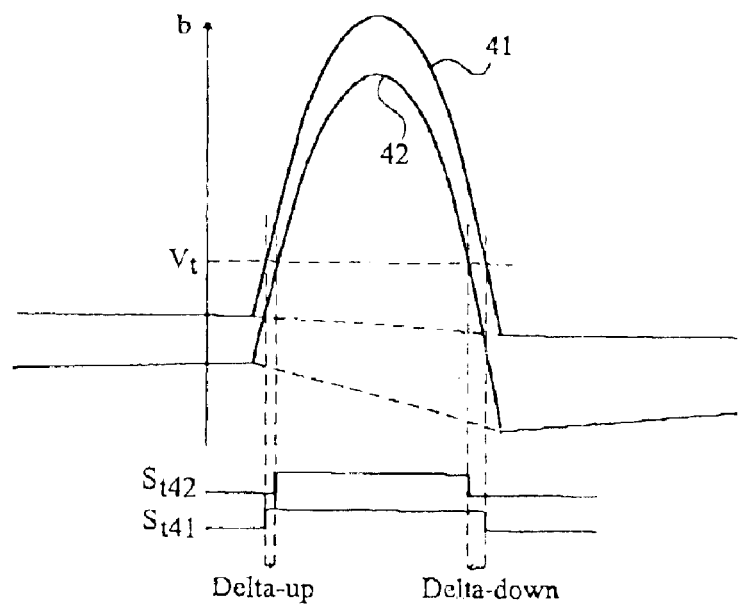
FIG. 8 illustrates waveforms of signals of the compensation circuit of FIG. 7.

FIG. 8 shows the waveforms of the voltage b on node B according to the current drawn by the circuit 30 to modify the voltage b on node B. Corresponding output signals $S_t$ of the threshold detector 3 are represented below. The waveform 41 of voltage b and the signal $S_{t41}$ correspond to the case (1) where no current is drawn by the circuit 30. The waveform 42 of voltage b and the signal $S_{t42}$ correspond to the case (2) where a current is drawn by the circuit 30.

In both cases, (1) and (2), the input resistor of the threshold detector 3 is not infinite. Consequently, the node B is linked to the ground by a resistor Rin represented in dotted lines on FIG. 6. The capacitors Cr1, Cr2 and the resistor Rin constitute a highpass filter with a high but not infinite time constant. Thus, the voltage b increases slowly between two flyback pulses. Similarly, some current is drawn during the flyback pulse through the resistor Rin and the voltage b is lower at the end of the pulse than at the beginning.

In case (1), when no current is drawn by the circuit 30, the average voltage b is null. The voltage b is then slightly lower at the end of the pulse than at the beginning.

In case (2), when a current is drawn during the pulse by the circuit 30, the voltage b at the end of the flyback pulse is much lower than at the beginning of the pulse. As voltage b at the end of the flyback is lower, the voltage difference between node B and the ground is higher. As a consequence, the rising slope of voltage b between two flyback pulses is higher in case (2) than in case (1). Though the voltage b increases more quickly during two flyback pulses, the voltage b at the beginning of a new flyback pulse is lower in case (2) than in case (1).

In other words, when the average brightness of the image is unchanged for several lines, the average voltage b is fixed and its value depends on the electron beam current. More precisely, when there is no current drawn by the circuit 30, the average voltage b is 0 V (the ground) and when there is a current drawn, the average voltage b is negative.

As represented in FIG. 8, voltage b corresponding to case (2) is always lower than voltage b corresponding to case (1). Thus, when the voltage b rises at the beginning of a flyback pulse, it "crosses" the threshold voltage $V_t$ later in case (2) than in case (1). The detection of the beginning of the pulse is later in case (2) than in case (1) with a delay "Delta-Up". Conversely, the detection of the end of the pulse is sooner in case (2) than in case (1) with an advance of "Delta-Down". Due to the high discharge current of the circuit 30, all the parts of the flyback pulse are shifted down. The shift of voltage b between case (1) and case (2) is all the more important as the discharge time is high. The end of the pulse in case (2) is then much more shifted down than the beginning of the pulse. As a result, Delta-Down is much greater than Delta-Up.

Consequently, the middle of the pulse of the signal $S_{t42}$ appears sooner than the middle of the pulse of signal $S_{t41}$. Thus, when some current is drawn by the circuit 30, the flyback pulse is detected as being in advance compared to the flyback pulse corresponding to the case where no current is drawn.

As described previously in relation to FIG. 7, when the electron beam current is low, the current drawn is high and conversely. Thus, when the electron beam current is low, the middle of the pulse of signal $S_t$ is artificially advanced by the action of circuit 30. When the electron beam current is high, the voltage b is not changed by the circuit 30 but the middle of the pulse of the signal $S_t$ is advanced due to the phenomenon described in relation to FIG. 4. Consequently, the phase comparison between the middle of the flyback pulse and the video signal synchronisation pulse no longer depends on the electron beam current. The phase comparator 4 is tuned so that the targeted phase difference between both signals corresponds to a correct video scanning with a central positioning of the image on the screen.

Having thus described at least one illustrative embodiment of the invention, various alterations, modifications and improvements will readily occur to those skilled in the art. Such alterations, modifications and improvements are intended to be within the spirit and scope of the invention. Accordingly, the foregoing description is by way of example only and is not intended to be limiting. The invention is limited only as defined in the following claims and the equivalent thereto.

What is claimed is:

1. A control circuit for an electron tube display comprising a deflection coil, the deflection coil being part of a scanning circuit and being coupled to a coil of a transformer powering a high voltage generator used to accelerate an electron beam, a phase locked loop being used to keep in phase the flyback pulses produced by the scanning circuit and the video signal synchronisation pulses, comprising:
   an electron beam current measuring circuit,
   a compensation circuit for compensating the phase difference between the flyback pulses and the video signal synchronisation pulses as a function of the measured current.

2. A control circuit according to claim 1 in which one terminal of the coil of the transformer powering the high voltage generator is linked to a storage capacitor by a diode, the voltage through the storage capacitor being equal to the high voltage, the second terminal of the coil being connected to the intermediate node between a capacitor and a resistor in series between a power supply and the ground, the capacitor and the resistor constituting the electron beam current measuring circuit.

3. A control circuit according to claim 2 in which a resistive bridge is connected between the intermediate node between the capacitor and the resistor and the ground.

4. A control circuit according to claim 1 in which the compensation circuit modifies, according to the electron beam current measured, the output control signal of a phase comparator which is part of the phase locked loop, the phase comparator detecting differences in phase between the flyback pulses and the synchronisation pulses.

5. A control circuit according to claim 1 in which two flyback capacitors in series are connected between one terminal of the deflection coil and the ground, the voltage on the intermediate node between the two flyback capacitors being the flyback pulse analysed by a phase comparator which is part of the phase locked loop, the phase comparator detecting differences in phase between the flyback pulses and the synchronisation pulses.

6. A control circuit according to either claim 2 or claim 5 in which the anode of a second diode is connected to the power supply, the cathode of the second diode being connected to the collector of a bipolar transistor NPN, the anode of a third diode being connected to the intermediate node between the two flyback capacitors, the cathode of the third diode being connected to the collector of the bipolar transistor, the emitter of the bipolar transistor being linked to a fixed voltage supply by a second resistor, the base of the bipolar transistor being connected to the intermediate node between the capacitor and the resistor.

7. A control circuit for an electron tube display comprising a scanning circuit and a phase locked loope that is used to keep flyback pulses produced by the scanning circuit and video signal synchronization pulses in phase, the phase locked loop comprising an electron beam current measuring circuit, and a compensation circuit for compensating a phase difference between the flyback pulses and the video signal synchronization pulses in response to a measured current.

8. The control circuit of claim 7, wherein the electron tube display includes a deflection coil coupled to a coil of a transformer that powers a high voltage generator.

9. A control circuit according to claim 8 in which one terminal of the coil of the transformer powering the high voltage generator is linked to a storgage capacitor by a diode, the voltage through the storage capacitor being equal to the high voltage, the second terminal of the coil being connected to the intermediate node between a capacitor and a resistor in series between a power supply and the ground, the capacitor and the resistor constituting the electron beam current measuring circuit.

10. A control circuit according to claim 9 in which a resistive bridge is connected between the intermediate node between the capacitor an the resistor and the ground.

11. A control circuit according to claim 7 in which the compensation circuit modifies, according to the electron beam current measured, the output control signal of a phase comparator which is part of the phase locked loop, the phase comparator detecting differences in phase between the flyback pulses and the synchronization pulses.

12. A control circuit according to claim 7 in which two flyback capacitors in series are connected between one terminal of the deflection coil and the ground, the voltage on the intermediate node between the two flyback capacitors being the flyback pulse analyzed by a phase comparator which is a part of the phase locked loop, the phase comparator detecting differences in phase between the flyback pulses and the synchronization pulses.

13. A control circuit according to claim 12, in which the anode of a second diode is connected to the power supply, the cathode of the second diode being connected to the collector of a bipolar transistor NPN, the anode of a third diode being connected to the intermediate node between the two flyback capacitors, the cathode of the third diode being connected to the collector of the bipolar transistor, the emitter of the bipolar transistor being linked to a fixed voltage supply by a second resistor, the base of the bipolar transistor being connected to the intermediate node between the capacitor and the resistor.

14. A display control circuit, comprising:
   a circuit that measures an electron beam current; and
   a compensation circuit that compensates a phase difference between flyback pulses and video signal synchronization signals in response to at least the electron beam current; and
   a phase comparator that provides an output signal in response to at least the phase difference and the electron beam current.

15. The display control circuit of claim 14, further comprising:
a comparator having a first input coupled to a reference voltage and a second input coupled to an output of the circuit that measures the electron beam current.

16. The display control circuit of claim 14, wherein the circuit that measures the electron beam current comprises a capacitor coupled to a ground voltage, and a resistor coupled to a supply voltage.

17. A method of controlling a display, comprising:

measuring an electron beam current; and compensating a phase difference between flyback pulses and video signal synchronization signals in response to at least the electron beam current;

wherein the compensating comprises providing a control signal in response to at least the electron beam current; and wherein the compensating further comprises receiving the control signal and adjusting an output of a phase comparator in response to at least the control signal.

18. The method of claim 17, wherein the compensating comprises providing a voltage representative of the electron beam current.

19. The method of claim 18, wherein the compensating further comprises comparing the voltage representative of the electron beam current to a threshold voltage.

* * * * *

UNITED STATES PATENT AND TRADEMARK OFFICE
CERTIFICATE OF CORRECTION

| | |
|---|---|
| PATENT NO. | : 7,071,636 B2 |
| APPLICATION NO. | : 10/423659 |
| DATED | : July 4, 2006 |
| INVENTOR(S) | : Jean-Michel Moreau |

It is certified that error appears in the above-identified patent and that said Letters Patent is hereby corrected as shown below:

Col. 7, line 28, should read:
--equivalents thereto.--

Col. 8, line 1 should read:
--6. A control circuit according to claim 2--
    line 12 should read:
--a scanning circuit and a phase locked loop that is used to--
    line 24 should read:
--voltage generator is linked to a storage capacitor by a--
    line 33 should read:
--between the capacitor and the resistor and the ground.--
    line 45 should read:
--which is a part of the phase locked loop, the phase com--

Signed and Sealed this

Twenty-sixth Day of September, 2006

JON W. DUDAS
*Director of the United States Patent and Trademark Office*